Patented Nov. 26, 1940

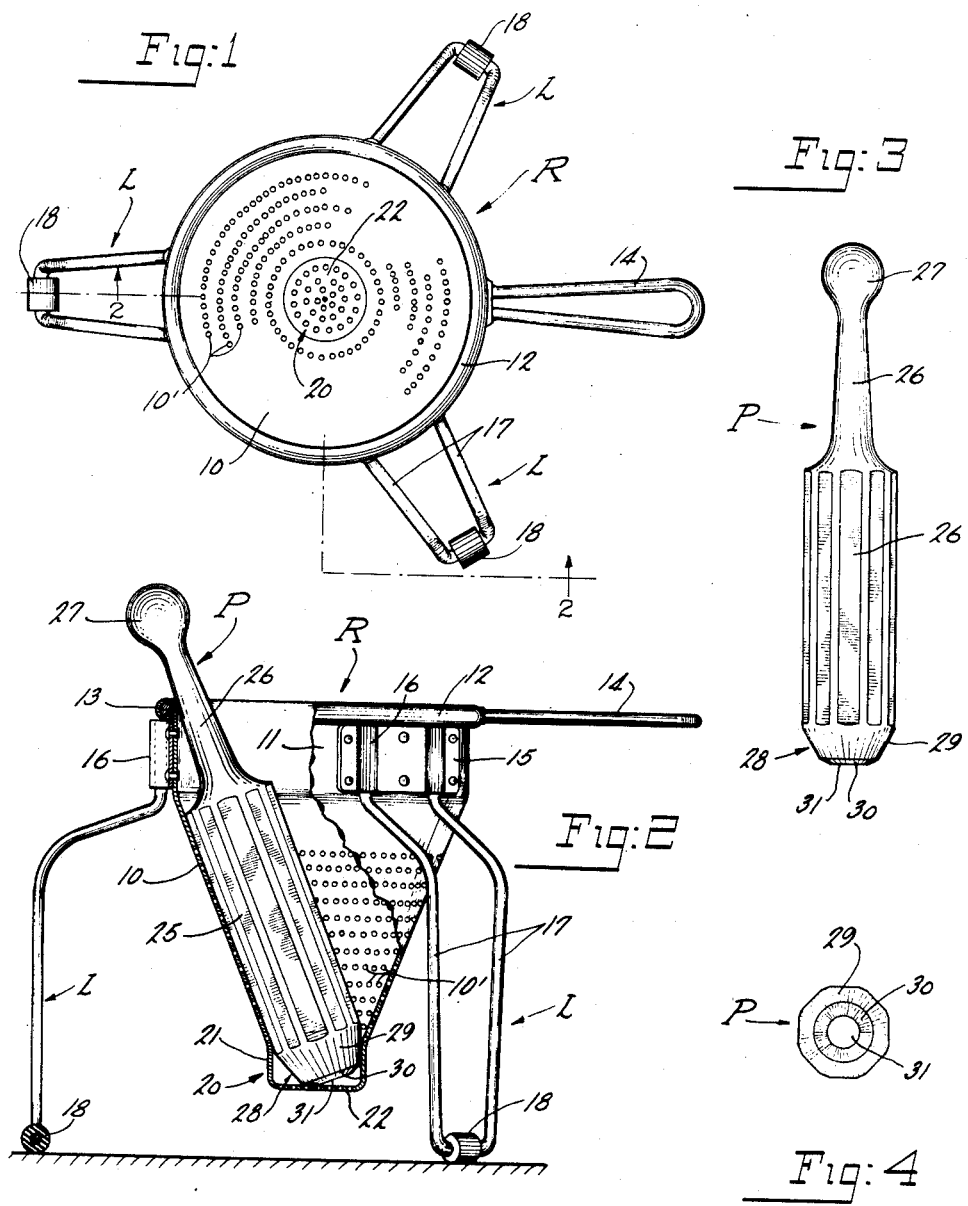

2,222,773

UNITED STATES PATENT OFFICE 2,222,773

FOOD PREPARING UTENSIL

Ralph N. Kircher, West Bend, Wis., assignor to West Bend Aluminum Company, West Bend, Wis., a corporation of Wisconsin Application January 10, 1940, Serial No. 313,197

3 Claims. (Cl. 146—172)

This invention relates to an improvement in food-preparing utensils of the type designed for ricing potatoes, crushing fruits, or similarly preparing other kinds of food.

The present invention is in the nature of an improvement in that type of food-preparing utensil which forms the subject matter of the application of Robert H. Wentorf for "Food preparing utensils," filed June 29, 1938, Serial No. 216,560, and assigned to the assignee of the present application.

The object of the invention is to provide a food-preparing utensil which has all of the advantages of the type of structure which is disclosed in the application mentioned above, and which in addition simplifies the construction, reduces the cost of manufacture thereof, renders it easier to clean, and facilitates the twirling of the pestle in the receptacle as well as improves its action.

Another object is to provide a utensil of this character which is so constructed and organized as to provide two sets of interengageable rolling surfaces between the lower end of the pestle and a socket at the lower end of the pestle which so coact as to make it easier to hold the pestle down and constrain it to its proper movement, and also to extrude through the perforated lower end of the socket any material finding its way to points below the lower end of the pestle.

Other objects and advantages reside in certain novel features of the construction, arrangement, and combination of parts, which will be hereinafter more fully described and particularly pointed out in the appended claims, reference being had to the accompanying drawing forming a part of this specification, and in which:

Figure 1 is a view in top plan showing a receptacle and stand of a food-preparing utensil embodying the present invention, the pestle being omitted.

Figure 2 is a view partly in side elevation and partly in transverse vertical section, taken on line 2—2 of Figure 1, showing how the pestle and receptacle are interrelated in use.

Figure 3 is a detailed view in elevation of the pestle; and

Figure 4 is a view thereof in bottom plan.

Referring to the drawing, it will be seen that a food-preparing utensil embodying the present invention comprises generally a receptacle R, a pestle designated at P, and suitable support for the receptacle, which may be a suitable stand, or may be provided by supporting legs L. The receptacle R comprises a body portion 10 having the general form of an inverted cone, and having its conical portion provided with a suitable number of apertures 10' through which the food is expressed.

The upper end of the receptacle has an imperforated cylindrical portion 11 which may be provided with a rolled bead 12 around its upper edge, the bead being rolled about a reinforcing wire 13. The reinforcing wire 13 may be extended and shaped to provide a handle 14.

Where the receptacle is supported by legs L an attaching bracket 15 for each leg is provided and is riveted or otherwise suitably secured to the outside of the cylindrical portion 11. Each of said brackets 15 has two vertical sockets, designated at 16, which are designed to receive the upper ends of the side members 17 of its leg L. As illustrated, the legs L may be constituted of wire stock, which is sufficiently stiff and strong and bent into approximately U shape. To the bight or body portion of each U-shaped leg a cushioning pad or sleeve 18 is secured.

Integral with the lower end of the receptacle 10 is a socket, designated generally at 20, and which is constituted of a cylindrical peripheral wall 21, which may be imperforate, and a perforated body wall 22 which is integral with the cylindrical wall 21 and horizontally disposed.

The pestle P may be conveniently made of wood, and has a body portion 25, a reduced neck 26, a knob or handle 27, and at its lower end is provided with a double beveled stud-like extension 28. The double beveled or double tapered stud-like extension 28 has its surface defined by the frustums of two cones, one tapered or conical surface being designated at 29 and the other at 30. The lower tapered or conical surface 30 merges into the flat lower end 31 of the pestle.

In the use of the device the pestle is disposed in the receptacle R in the manner illustrated in Figure 2, and when so disposed lies over at an angle, or is inclined with respect to the vertical axis of the receptacle. The angle of taper of the surface 29 is equal to the angle of inclination of the pestle so that when the pestle is in operative position, the portion of the tapered surface engaged with the cylindrical peripheral wall of the socket is vertically disposed and is in rolling contact with such wall. Moreover, the angle at which the tapered surface 30 is disposed is such that in the operative position of the pestle this tapered surface 30 is horizontally disposed and flatly engages the bottom wall 22 of the socket 20 and is in rolling engagement therewith. This particular arrangement of tapered surfaces, and the way in which they are interrelated with the socket of the receptacle, distributes the load and the wear, not only on two surfaces of the pestle, but on two surfaces of its socket, and due to the way in which the engaging surfaces are related, it is very convenient for the operator to exercise complete control over the pestle and to readily impart the desired movements thereto.

While I have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

I claim:

1. A utensil of the character described comprising an upright receptacle having a perforated body portion of inverted conical form, said body portion having a socket at the lower end thereof including a vertically disposed cylindrical peripheral wall and a horizontally disposed bottom wall, and a pestle cooperable with the receptacle and inclined with respect to the vertical axis thereof to have rolling contact with the body portion of the receptacle in its operative position, said pestle having a stud-like extension at its lower end, said stud-like extension having upper and lower tapered surfaces, the angle of taper of the upper of said surfaces being equal to the angle of inclination of the pestle with respect to the vertical axis of the receptacle whereby when said stud-like extension and said socket are interfitted the said upper tapered surface is vertically disposed and in rolling contact with the vertical cylindrical peripheral wall of the socket, the lower tapered surface being in rolling contact with the bottom of the socket.

2. A utensil of the character described comprising an upright receptacle having a perforated body portion of inverted conical form, said body portion having a socket at the lower end thereof including a cylindrical peripheral wall and a bottom wall, and a pestle cooperable with the receptacle and inclined with respect to the vertical axis thereof so as to be in rolling contact with the body portion of the receptacle in its operative position, said pestle having a double tapered stud-like extension at its lower end, one of said tapered surfaces being in rolling contact with the peripheral wall of the socket and the other in rolling contact with the bottom wall thereof.

3. A utensil of the character described comprising an upright receptacle having a perforated body portion of inverted conical form, said body portion having a socket at the lower end thereof including a cylindrical peripheral wall and a bottom wall, and a pestle cooperable with the receptacle and inclined with respect to the vertical axis thereof so as to be in rolling contact with the body portion of the receptacle in its operative position, said pestle having a double tapered stud-like extension at its lower end, one of said tapered surfaces being in rolling contact with the peripheral wall of the socket and the other in rolling contact with the bottom wall thereof, said bottom being perforated whereby the pestle extrudes through the perforations in the bottom wall any particles of material that find their way to points below the lower end of the pestle.

RALPH N. KIRCHER.